United States Patent [19]

Fantozzi et al.

[11] Patent Number: 4,919,519

[45] Date of Patent: Apr. 24, 1990

[54] FLUID THERMAL COMPENSATION SYSTEM

[75] Inventors: Louis R. Fantozzi, Pelhem; James P. Hopkins, Nashua, both of N.H.

[73] Assignee: Diversified Optical Corp., Farmingdale, N.Y.

[21] Appl. No.: 250,865

[22] Filed: Sep. 29, 1988

[51] Int. Cl.$^5$ ................................................ G02B 7/02
[52] U.S. Cl. ...................................... 350/253; 350/255
[58] Field of Search ............... 350/253, 252, 451, 255; 358/237

[56] References Cited

U.S. PATENT DOCUMENTS

| | | | |
|---|---|---|---|
| 3,498,695 | 3/1970 | Brouwer | 350/253 |
| 3,612,664 | 10/1971 | Berman | 350/451 |
| 4,286,839 | 9/1981 | Ilzig et al. | 350/255 |
| 4,525,745 | 6/1985 | Ghaem-Maghami et al. | 358/237 |

FOREIGN PATENT DOCUMENTS 0651290  3/1979  U.S.S.R. .............................. 350/253

Primary Examiner—Bruce Y. Arnold
Assistant Examiner—Loha Ben
Attorney, Agent, or Firm—Ostrolenk, Faber, Gerb & Soffen

[57] ABSTRACT

A system for adjustably locating a lens (16, 18) as a function of the temperature of the lens, comprising a housing (12) and a lens mount (14) which is movable in an aperture in said housing in an axial direction, the lens being mounted in the lens mount. An axially extending chamber is defined between a radial surface of a radially extending portion (34) of the housing and a radial surface (32) of a radially extending portion (22) of the lens mount. A fluid is accommodated in the chamber, the fluid having variable volume as a function of temperature, such that the distance between the two radial surfaces, and thereby the location of the lens, is variable as a function of the temperature of the fluid.

11 Claims, 2 Drawing Sheets

FLUID THERMAL COMPENSATION SYSTEM

BACKGROUND OF THE INVENTION

1. Field of the Invention

This invention relates to a system for temperature compensation of an optical system. It relates more particularly to a system employing a fluid interposed between a movable lens mount of an optical system and a fixed housing, wherein thermal expansion and contraction of the fluid moves the lens mount to temperature-compensate the lens system.

2. Background of the Invention

The focus of a lens system changes with ambient temperature. As is well known, an increase or decrease in ambient temperature changes the refractive properties of the lens elements, and accordingly changes the focus. By moving one or more of the lens elements toward or away from the desired focal plane in response to temperature changes, focus may be maintained. The actual required movement of the lens elements may be determined according to well-known principles.

The invention relates to a particular implementation of a thermal compensation system which may be employed to provide any desired movement-temperature characteristics once they have been determined.

Many previous temperature compensation (also referred to as athermalization) mechanisms have employed solid members such as alloys or plastics as the compensation elements. The linear expansion coefficient of the solid member and other structural features are selected such that its expansion and contraction gives the lens system the desired movement characteristics.

In these systems, however, the ability to compensate a given optical system under widely varying conditions has been limited, since a solid member is limited to expanding primarily in only one dimension.

It has also been suggested to employ a fluid of a type which expands and contracts with temperature, instead of a metal or plastic material, as one part of the compensation element. For example, U.S. Pat. No. 3,612,664 discloses an optical focus compensating device having a chamber filled with temperature-responsive fluid, and a piston which forms part of the chamber wall. The piston is spring-biased. A pivoting linkage is provided to move a lens mount in response to temperature changes in the fluid. An optional electric heat source may be provided adjacent to the fluid chamber, for varying the fluid temperature from a remote location.

U.S Pat. No. 4,525,745 discloses a projection television system wherein a focusing lens is mounted in an internal spiral groove of a housing, and means are provided for rotating the lens to move it one way or the other along the optical path and thereby change the focus. The housing has a molded internal spiral groove, into which a tab on the outer peripheral surface of the rotatable lens mount fits. One disclosed means for rotating the lens (FIG. 8) is a piston-cylinder-linkage arrangement similar to the '664 patent, mounted between the periphery of the lens and a point on the outer housing. In FIG. 6A, another piston-and-cylinder arrangement is shown. This patent discloses polyethylene glycol as a fluid material which may be employed.

These prior art systems require complicated linkages and awkward component arrangements that are disadvantageous for use, for example, in compact telescopes. Also, the fluid reservoirs in these systems cannot be located near enough to the lens to provide compensation according to the actual lens temperature.

Accordingly, an object of the present invention is to provide a thermally compensated focusing mechanism which is simple, requires a minimum of moving parts, and is compact.

Another object is to provide a system which employs a fluid in order to obtain and take advantage of expansion in three dimensions.

A further object is to locate the fluid in greater proximity to the lens being compensated than was possible in the prior art.

SUMMARY OF THE INVENTION

These objects and others are accomplished by a system for adjustably locating a lens as a function of the temperature of the lens, comprising:

a housing;

lens mount means in said housing for accommodating said lens, said lens mount means being movable in said housing in a first direction and an opposite second direction;

biasing means in said housing for exerting a biasing force on said lens mount means in said first direction; and expansion chamber means for receiving and accommodating a fluid which has variable volume as a function of temperature, said expansion chamber means being disposed between a portion of said housing and a portion of said lens mount means, and in proximity to said lens, said fluid causing said lens mount means to move in said first direction as its volume decreases with temperature, and causing said lens mount means to move in said second direction as its volume increases with temperature, for adjusting the location of said lens mount means with respect to said housing as a function of said fluid and thereby of said lens.

These features provide a system which is both passive and automatic. Its structure is simplified, so it is compact and fits readily into limited or non-conventional spaces. When compared to conventional metal- or plastic-type systems, this fluid-type system can provide for greater linear movement in a given space. Variable degrees of movement as a function of temperature may be obtained by varying the choice of fluid. Remote focusing is possible by remotely changing the fluid volume or remotely controlling the temperature of the fluid.

BRIEF DESCRIPTION OF THE DRAWINGS

Other objects, features and advantages of the invention will be understood from the following description of illustrative embodiments thereof, with reference to the accompanying drawings, in which.

DESCRIPTION OF EMBODIMENTS OF THE INVENTION

Figure 1:
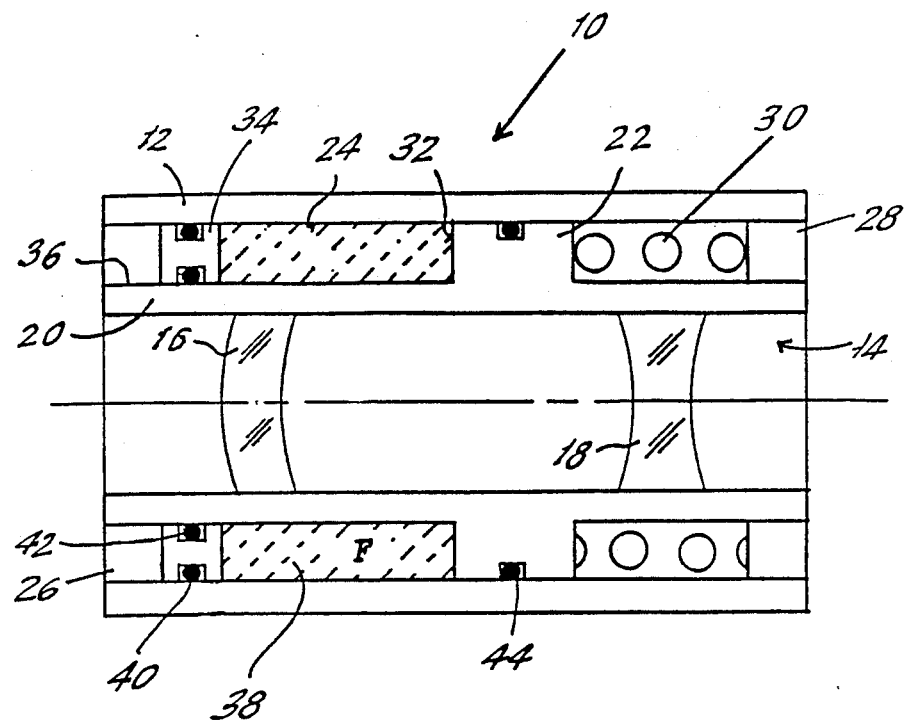
FIG. 1 is a simplified cross-sectional view showing a first embodiment of the invention.

FIG. 1 is a simplified cross-sectional view of a focusing assembly 10 according to a first embodiment of the invention. A housing 12 is cylindrical in this embodiment. A lens mount 14 retains a pair of lens elements 16, 18. The lens mount 14 is axially slidable in both directions (left and right in FIG. 1) within the housing 12.

The lens mount 14 comprises a barrel portion 20 which is cylindrical and retains the lens elements, and an annular flange portion 22 which extends radially outward from a central portion of the barrel portion 20. The flange portion 22 slidably contacts an inner surface 24 of the housing 12. The barrel portion 20 is spaced from the inner surface 24 by a pair of annular retainers 26, 28 at the left and right ends, respectively.

A compression spring 30 is retained in the space between the flange portion 22 and the retainer 28 for biasing the lens mount 14 in the leftward axial direction.

The annular radial surface 32, on the left side of the flange portion 22, axially opposes an annular sealer ring 34 disposed to the right of the retainer 26. Together with the inner surface 24 of the housing 12, and the outer surface 36 of the barrel portion 20, a chamber 38 is defined which contains a fluid F. The chamber 38 is sealed by outer and inner O-rings 40, 42 on the sealer ring 34, and an outer O-ring 44 on the flange portion 22.

The O-rings may be any elastic sealing material compatible with the fluid F. The fluid F is advantageously a mixture of 66% ethylene glycol (with inhibitors) and 34% water. This mixture has a freezing point of $-65°$ C., which is satisfactory for use at high altitudes and other cold environments. On the other hand, the coefficient of volumetric thermal expansion ($in^3/in^3$ or $m^3/m^3$) is 0.00054/° C. The other components are preferably aluminum, which provides for light weight and excellent corrosion resistance.

Thermal compensation of a lens is accomplished by moving a lens element or group of elements closer to or farther away from a focal plane to maintain focus at that plane despite an increase or decrease in temperature. The fluid optical athermalization mechanism employs the principle of thermal expansion of a fluid under an increase in temperature, and conversely the thermal contraction of the fluid under a decrease in temperature.

Accordingly, in the embodiment of FIG. 1, as temperature increases, the fluid F expands. Expansion is not limited to linear expansion characteristics, as it would be in a conventional metal or plastic-type system. A fluid expands not linearly, but volumetrically, and when sealed within chamber 38, and given only one direction in which to expand (against the radial surface 32), the expansion of the fluid will result in three times the expansion that would be obtained with a solid expanding member. The initial volume of the fluid determines its actual expansion (rather than its length, as with a solid). Expansion of a liquid is three times the degree of expansion of a similar solid, because the solid can expand in substantially only one dimension, while fluid expansion occurs in three dimensions.

Advantageously, the fluid will fill the chamber created for it, thus providing better utilization of space than any solid system. If a large volume of fluid is needed, a chamber can be designed to accommodate that volume. Designing a chamber to accommodate a volume is inherently simpler than designing a space to accommodate a lengthwise expanding solid member.

A further advantage of the fluid system is that, if in a particular embodiment of the invention, the fluid volume and thus the expansion is found to be too great for a particular purpose, any solid body that has negligible thermal expansion can be placed in the chamber to take up space and eliminate a portion of the undesired expansion.

As clearly seen in FIG. 1, the chamber 38 is in intimate proximity to the lenses 16, 18 and the lens mount 20. Thus, the temperature of the fluid F corresponds closely to the temperature of the lenses, which results in improved thermal compensation accuracy.

Figure 2:
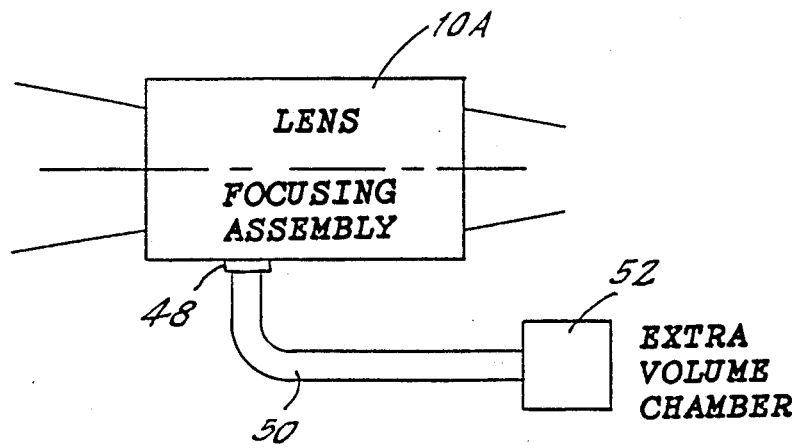
FIG. 2 is a schematic view showing a modification of the embodiment of FIG. 1.

FIG. 2 is a schematic view showing a modification of the embodiment of FIG. 1, in which the fluid chamber of a lens focusing assembly 10A has an outlet port 48 through which it communicates with a tube or the like 50, which in turn communicates with an extra volume chamber 52. Thus, the focusing assembly 10A can be easily modified by attaching the additional chamber 52, as the compensation requirements change, for example when used with different telescopes or other optical devices, or under different environmental conditions. If the extra volume chamber is not necessary, the port 48 can of course be closed and sealed.

Figure 3:
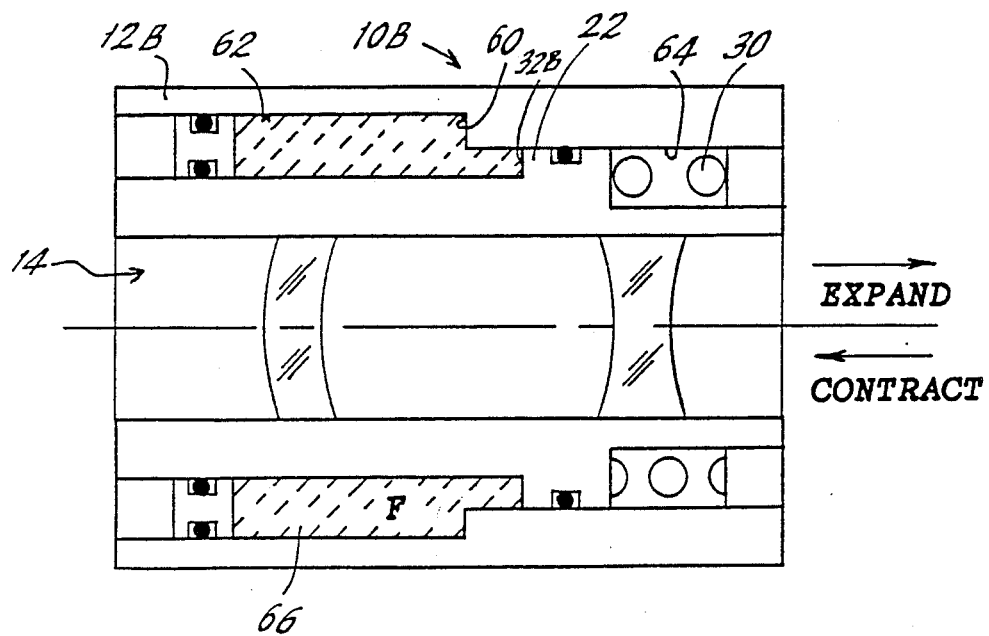
FIG. 3 is a simplified cross-sectional view showing a further embodiment of the invention.

A further embodiment of the invention is shown in FIG. 3. Elements and parts that are similar to those in FIG. 1 will not be specifically described. In this embodiment, the housing 12B of a focusing assembly 10B is not a uniform cylinder as in the embodiment of FIG. 1, but rather has an annular, radially oriented step 60 in its inner surface. The step 60 interconnects an inner surface portion 62, which is similar to the inner surface 24 of the housing in the embodiment of FIG. 1; and a second inner surface portion 64, whose inside diameter is smaller than that of the inner surface portion 62. The flange portion 22 of the lens mount 14 slidably contacts the inner surface portion 64. The compression spring 30 is retained in a portion of the housing inward of the inner surface portion 64.

A chamber 66 for containing a fluid F is defined at its right-hand end by the step surface 60 and by a radially extending surface 32B of the flange portion 22. This is in contrast to the embodiment of FIG. 1, in which a single radially extending annular surface 32 is defined at the right-hand end of the chamber 38.

Assuming other factors and dimensions are equal, the principal difference between the embodiments of FIG. 1 and FIG. 3 is that the surface 32B in FIG. 3 has substantially less surface area than the surface 32 in the embodiment of FIG. 1. The fluid will expand volumetrically, but only into a space provided for such expansion, namely the limited, cylindrical area defined by the surface area 32B. Thus, assuming the volume of the fluid F is similar in both of these embodiments, the system of FIG. 3 will provide several times the expansion of the fluid against the flange portion 22. Thus, by changing the cross-sectional area of the portion of the lens mount which is movable under fluid expansion, varying rates of movement for a given temperature change can be achieved.

Initial focusing of these devices is easily and accurately accomplished by either of two methods. First, the location of the flange portion 22 itself may be set by adjusting the location of the sealing ring 34, and the retainer 26, or by adjusting the quantity of fluid.

Secondly, in a system similar to FIG. 2, extra fluid may be added to or removed from the fluid volume chamber to move the lens mount to the desired location. This focusing method changes the initial fluid volume, and thus may affect the compensation characteristics of the device to some extent. However, if the amount of fluid volume change is minimal, any degradation of the compensation characteristics will not be major. This second method is advantageous, in that it may be done remotely, requiring only manipulation of the tube 50 to carry the fluid to or from the chamber.

Another advantageous way to accomplish this task would be with a needle and syringe. The port 48 could be provided with a rubber diaphragm through which the needle could be inserted.

Preferably, the chamber is evacuated before being filled with fluid, to simplify the filling process. The assembly is placed in a small vacuum chamber, which is evacuated. Then, an appropriate fluid reservoir is connected to the port 48. The reservoir is then opened to ambient air pressure, which forces the fluid in the reservoir into the chamber.

Alternatively, if no vacuum is employed, a needle and syringe could be employed to remove air from the chamber periodically as the fluid is being inserted.

According to a further alternative, a gas pressure chamber could be substituted for the spring 30, with appropriate sealing.

Although the invention has been described herein with respect to specific embodiments thereof, it is to be understood that the invention is not limited to such embodiments. Rather, modifications and variations may occur to one of ordinary skill in the art, still within the scope of the invention, as defined in the claims.

What is claimed is:

1. A system for adjustably locating a lens as a function of an ambient temperature of the lens, comprising:
   a housing;
   lens mount means in said housing for accommodating said lens, said lens mount means being movable in said housing in a first direction and an opposite second direction;
   biasing means in said housing for exerting a biasing force on said lens mount means in said first direction; and
   chamber means for receiving and accommodating a fluid having variable volume as a function of said temperature, said chamber means being disposed between a portion of said housing and a portion of said lens mount means, and in proximity to said lens, for providing a compensating force exerted by said fluid on said lens mount means in said second direction, against said biasing force, for adjusting the location of said lens mount means with respect to said housing, as a function of the temperature of said fluid and thereby of said lens.

2. A system for adjustably locating a lens as a function of an ambient temperature of the lens, comprising:
   a housing;
   lens mount means in said housing for accommodating said lens, said lens mount means being movable in said housing in a first direction and an opposite second direction; and
   chamber means for receiving and accommodating a fluid which has variable volume as a function of said temperature, said chamber means being disposed between a portion of said housing and a portion of said lens mount means, and in proximity to said lens, said fluid causing said lens mount means to move in said first direction as its volume decreases with temperature, and causing said lens mount means to move in said second direction as its volume increases with temperature, for adjusting the location of said lens mount means with respect to said housing as a function of the temperature of said fluid and thereby of said lens.

3. A system as in claim 2, further comprising biasing means in said housing for exerting a biasing force on said lens mount means in said first direction.

4. A system as in claim 2, wherein said chamber means further comprises:
   reducing means for reducing at least one dimension of said chamber means, for adjusting said movement of said lens mount means.

5. A system as in claim 4, wherein said reducing means is for reducing the volume of said chamber means in order to reduce said movement.

6. A system as in claim 4, wherein said reducing means is for reducing a dimension of said chamber means, other than in said first or second direction, in order to increase said movement.

7. A system as in claim 2, further comprising second chamber means for receiving and accommodating a fluid in communication with said fluid in said first-mentioned chamber means.

8. A system for adjustably locating a lens as a function of an ambient temperature of the lens, comprising:
   a housing which defines a radial direction and an axial direction;
   a lens mount which is movable in an aperture in said housing in said axial direction, said lens being mounted in said lens mount;
   an axially extending chamber defined between a radial surface of a radially extending portion of said housing and a radial surface of a radially extending portion of said lens mount; and
   a fluid accommodated in said chamber, said fluid having variable volume as a function of said temperature, such that the distance between said two radial surfaces, and thereby the location of said lens, is variable as a function of the temperature of said fluid.

9. A system as in claim 8, wherein a portion of said chamber has a reduced dimension at least in a direction other than said axial direction.

10. A system as in claim 8, further comprising spring means in said housing for urging said respective radially extending portions of said housing and said lens mount toward each other, for opposing any increase in volume of said fluid.

11. A system as in claim 8, further comprising a second chamber and a fluid accommodated therein, in communication with said fluid in said first-mentioned chamber.

* * * * *